United States Patent [19]

Olowinski et al.

[11] 4,187,668

[45] Feb. 12, 1980

[54] ADJUSTABLE SUPPORT SYSTEM

[75] Inventors: Edward J. Olowinski, Erie, Pa.; Leonard W. Foster, Richardson, Tex.

[73] Assignee: Lord Corporation, Erie, Pa.

[21] Appl. No.: 967,746

[22] Filed: Dec. 8, 1978

[51] Int. Cl.[2] .............................................. D01H 7/12
[52] U.S. Cl. ..................................... 57/130; 57/135; 248/560; 248/638; 308/152
[58] Field of Search .................. 57/1 R, 88, 129–135; 308/26, 152; 248/560, 571, 580, 605, 638

[56] References Cited

U.S. PATENT DOCUMENTS

| 580,718 | 4/1897 | Scheid | 308/152 |
|---|---|---|---|
| 590,377 | 9/1897 | Scheid | 308/152 |
| 590,378 | 9/1897 | Scheid | 308/152 |
| 2,954,661 | 10/1960 | Rowe, Jr. | 57/132 |
| 3,364,670 | 1/1968 | Stiepel et al. | 57/130 X |
| 3,641,759 | 2/1972 | Kohler | 57/129 |
| 3,798,888 | 3/1974 | Mandl | 57/135 |
| 3,835,634 | 9/1974 | Anderson et al. | 57/130 |
| 3,885,767 | 5/1975 | Olowinski et al. | 308/26 |
| 3,942,314 | 3/1976 | Olowinski | 57/135 |
| 4,045,948 | 9/1977 | Hannibal | 57/129 |

Primary Examiner—John Petrakes
Attorney, Agent, or Firm—Maurice R. Salada; James W. Wright

[57] ABSTRACT

An adjustable support system mounts one member, such as a textile spindle, on a second member, such as a textile machine rail, so as to reduce the transmission of vibrations between the two members. The support system incorporates a flange to which is secured an elastomeric element for resiliently mounting the textile spindle relative to the flange. The flange is kept spaced apart from the machine rail by a member or members that at least contact the flange and at least contact the machine rail. The spacing between the flange and the machine rail can be adjusted through manipulation of adjusting screws or bolts in such a manner as to change the orientation of the flange and the textile spindle mounted on the flange relative to the machine rail. Like the spacing member, the adjusting elements contact both the flange and the machine rail. The adjusting elements are spaced, however, from the elastomeric element that mounts the textile spindle on the flange so as to avoid compressing the elastomeric element between the adjusting elements and the flange. Adjustments in the spacing between the flange and the machine rail are accommodated by a resilient member that includes a body of elastomer and contacts both the machine rail and a member that moves in response to adjustments of the adjusting elements. The adjusting elements are preferably arranged in a circumferential array about the flange.

20 Claims, 4 Drawing Figures

ADJUSTABLE SUPPORT SYSTEM

BACKGROUND OF THE INVENTION

There are many circumstances in which it is desirable to prevent vibrations in one structure or member from being transmitted to an adjacent structure or member. In industrial machinery, for example, vibration isolation helps to minimize noise levels in work areas, prevent damage to sensitive recording and other instrumentation, and permit proper operation of the machinery without the interference of high levels of transmitted vibration. A textile yarn processing machine is one example of an industrial machine in which there is a significant need for vibration isolation. A textile yarn processing machine typically includes at least one spindle rail that is fixed to the machine, is oriented generally horizontally, and extends along the length of the machine. The spindle rail has a number of stations, each of which is designed to support a generally vertically oriented textile spindle. Mounted on the spindle rail at each spindle station is a ring that is positioned to encircle the upper end of a textile spindle installed at the spindle station. The ring is movable vertically along the upper end of the textile spindle so as to guide yarn onto a bobbin carried by the spindle. When the ring and the spindle are properly aligned and functioning, the yarn is evenly wound on the bobbin and forms a neat package.

Because textile spindles rotate at speeds of from about six thousand (6000) to about twenty thousand (20000) revolutions per minute, a substantial amount of vibration and vibration induced noise can be generated by even a single textile spindle. In a textile plant, which may include several textile machines, each of which carries one hundred or more spindles, the noise produced can be deafening. Efforts to reduce the vibration and vibration induced noise levels in textile machinery typically involve the interposition of resilient mountings between each textile spindle and the machine rail on which the spindle is mounted. The resilience of such mountings is often provided by bodies of elastomer, as is exemplified by the textile spindle mountings described and illustrated in patents such as Olowinski et al U.S. Pat. No. 3,885,767, Olowinski U.S. Pat. No. 3,942,314, and Hannibal U.S. Pat. No. 4,045,948.

In addition to its tendency to generate vibrations and vibration induced noise when rotating, a textile spindle poses special problems as a result of the need vertically to align or plumb the spindle. If, for example, a rotating spindle is not in proper vertical alignment with the ring that moves up and down along the spindle to guide the yarn onto the bobbin carried by the spindle, the resulting yarn package will be inaccurately and unevenly wound and will tend to be unstable. The most widely used and well established method of plumbing a textile spindle is to place thin shims between a flange carried by the spindle and the machine rail on which the spindle is mounted. In such a plumbing operation, the spindle is mounted on the machine rail in a position such that the spindle is centered with reference to the ring when the ring is located closest to the machine rail. The ring is subsequently moved to its farthest position from the rail and the upper end of the spindle is centered in the ring by placing cardboard or paper shims between the machine rail and the flange carried by the spindle near its base. Although the shimming procedure is difficult, tedious, and time consuming, it is widely used and individuals who are capable of producing satisfactory results utilizing the procedure are regarded as skilled technicians in the textile industry.

An alternative to plumbing a textile spindle using paper shims is to provide a mechanical device for plumbing. An effective mechanical plumbing device should make plumbing a more routine and less time consuming procedure by eliminating the need to judge the required thicknesses and positions of shims. One type of mechanical plumbing device that has been proposed includes an annular flange or collar that is attached to or supports the base of a textile spindle. The collar is secured to the machine rail using three threaded members, such as bolts or screws, which are circumferentially and equally spaced about the collar and which extend between the collar and the machine rail. By rotating each screw or bolt in an appropriate direction, the distances between the machine rail and various portions of the collar can be adjusted. Thus, the orientation of the collar and the textile spindle relative to the machine rail is adjusted. Examples of so-called "three-point" plumbing mechanisms are described and illustrated in Scheid U.S. Pat. No. 590,378, Scheid U.S. Pat. No. 580,718, and McCombs U.S. Pat. No. 3,672,023. A somewhat similar mechanism, in which the three screws are not equally spaced about the collar, is described and illustrated in Knight et al U.S. Pat. No. 1,213,657. Other mechanical plumbing devices utilize components with mating spherical, conical, or otherwise sloped surfaces. By sliding the juxtaposed components relative to each other on their mating surfaces, the vertical alignment of a textile spindle supported by the plumbing mechanism can be changed. Examples of mechanical spindle plumbing devices that incorporate mating curved or sloped surfaces on adjacent components are described and illustrated in Scheid U.S. Pat. No. 590,377, Rowe, Jr. U.S. Pat. No. 2,954,661, Stiepel et al U.S. Pat. No. 3,364,670, and Anderson et al U.S. Pat. No. 3,835,634.

In the past, some efforts have been made to provide both vibration isolation and mechanical plumbing capability in a single mounting or support system for a textile spindle. Examples of such spindle mountings or support systems are described and illustrated in the previously mentioned Rowe, Jr. U.S. Pat. No. 2,954,661 and Stiepel et al U.S. Pat. No. 3,364,670. The plumbing procedures for the Stiepel et al mounting system are more fully described at column 3, lines 27-54 of the previously mentioned Anderson et al U.S. Pat. No. 3,835,634. Both the Rowe, Jr. spindle mounting and the Stiepel et al spindle mounting system incorporate juxtaposed metal components with mating spherical or conical surfaces to provide the necessary plumbing capability. Mating surfaces are utilized for plumbing in order to minimize the conflict between the need to fasten a textile spindle securely to a machine rail and the need to plumb the spindle. The Rowe, Jr. spindle mounting, for example, can be securely fastened to a machine rail and a textile spindle inserted into the mounting, all prior to plumbing. The orientation of the textile spindle with respect to the mounting is then adjusted by sliding two curved surfaces carried by the spindle relative to two mating surfaces carried by the mounting. When the proper vertical alignment of the spindle is achieved, a retaining nut, which provides one curved surface and is carried on the end of the spindle, is tightened down against the adjacent end of the mounting, which provides a mating curved surface. Tightening the retaining nut to secure the spindle to the mounting will not change the vertical alignment of the spindle because the two sets of mating surfaces are always in close, evenly supported contact.

In comparison to the Rowe, Jr. spindle mounting, which incorporates mating spherical surfaces for plumbing, a three-point spindle plumbing mechanism such as the device shown in the previously mentioned McCombs U.S. Pat. No. 3,672,023 poses more problems in terms of plumbing a textile spindle and securing the plumbed spindle to its supporting rail. If McCombs' plumbing device is utilized to plumb a textile spindle, the spindle cannot be securely attached to its supporting rail until after the plumbing operation is complete. Thus, as McCombs' device is being adjusted to plumb the spindle, there is some looseness between the spindle, the plumbing device, and the supporting machine rail. After the mechanical plumbing adjustments appear to be complete, a retaining nut is tightened on the base of the spindle to clamp the spindle to the plumbing device and the machine rail. Because the juxtaposed surfaces of the nut and the machine rail, for example, are flat, plumbing adjustments of the spindle will tend to place the two surfaces at a slight angle to each other and thereby prevent even contact between the surfaces. As a result, it would not be at all unusual to find that after the spindle was securely clamped in place and the play or looseness eliminated from between the spindle and the plumbing device, the spindle was no longer perfectly plumb. The retaining nut would then have to be loosened and the spindle replumbed, subject to the possibility of renewed misalignment when the spindle is again tightly clamped to the machine rail.

SUMMARY OF THE INVENTION

The present invention relates to a support system for mounting one member, such as a textile spindle, on a second member, such as a textile machinery rail, so as to reduce the transmission of vibrations between the two members, while permitting adjustments in the relative orientation of the two members. As used specifically to support textile spindles, the system permits mechanical plumbing adjustment without requiring carefully machined, mating surfaces on two juxtaposed metal components. The support system of the invention comprises a flange member fabricated of substantially inextensible material to which is secured a resilient element or elements. The resilient element, which includes at least one body of elastomer, mounts a first or supported member resiliently relative to the flange. The flange is kept spaced from a second or supporting member by a structure that at least contacts the flange and the second member. The spacing between at least a portion of the flange member and at least a portion of the second member can be adjusted by an adjusting device or devices so as to change the flange member's orientation relative to the second member. Like the spacing structure, the adjusting device includes a portion that at least contacts the flange member and a portion that at least contacts the second member. The adjusting device is disposed in spaced relation relative to the resilient element or elements so as to avoid compressing the elastomer of the resilient element between the adjusting device and the flange. Adjustments in orientation between the flange and the second member are resiliently permitted and accommodated by a member that includes at least one body of elastomer. The adjustment accommodating member includes a portion that at least contacts the second member and a portion that at least contacts a member that moves in response to adjustments of the adjusting device. As a result of the construction of the support system of the invention, one member, such as a textile spindle, may be secured to a second member, such as a textile machinery rail, and yet still have its orientation relative to the second member or machinery rail adjusted without loosening the attachment between the first and second members. Movements between the second or supporting member, on the one hand, and the flange member and first or supported member, on the other hand, which result from manipulation of the adjusting device are accommodated through deformation and deflection of the adjustment accommodating member.

In a preferred embodiment of the invention, the spacing structure is carried by the flange and may include a body of elastomer secured to the flange. The body of elastomer of the spacing structure may also act as the adjustment accommodating member. Alternatively, the spacing structure may include two threaded members received in threaded bores formed in the flange member. The threaded members, which may be bolts or screws, may also act as adjusting devices for the support system. For a textile spindle mounting installation, the flange of the support system will have formed in it a central opening to receive a textile spindle. Similarly, the resilient element that will mount the spindle to the flange member will have formed in it a central opening that is aligned with the central opening in the flange.

BRIEF DESCRIPTION OF THE DRAWING

For a better understanding of the invention, reference may be made to the following description of two exemplary embodiments, taken in conjunction with the figures of the accompanying drawing, in which.

DESCRIPTION OF THE EMBODIMENTS

Figure 1:
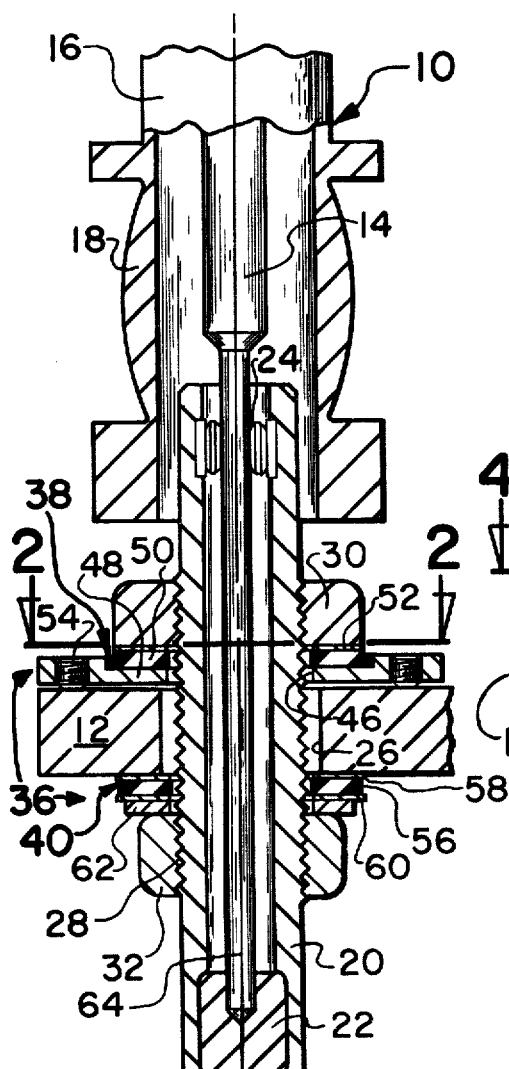
FIG. 1 is a side view, taken in section, of a textile spindle mounted on a machinery rail utilizing the support system of the present invention.

FIG. 1 of the drawing illustrates, in section, the lower portion of a textile spindle 10 mounted on a textile machinery rail 12. The spindle 10 includes a rotatable spindle blade 14 which is generally vertically oriented and which carries a hollow tubular sleeve 16 that encloses the upper portion of the blade. The sleeve 16 is configured at its lower end to define a whorl 18 that can be engaged by a drive tape (not shown) to rotate the sleeve and the spindle blade 14. The lower end of the spindle blade 14 is tapered relative to its upper end and is received in a tubular bolster 20. The bottom of the bolster 20 is closed and supports a footstep bearing 22 that is engaged by and carries the lower tip of the spindle blade 14. Adjacent the upper end of the bolster 20, a plurality of roller bearings 24 encircle the inner circumference of the bolster and engage the spindle blade 14. The footstep bearing 22 and the roller bearings 24 permit the spindle blade 14 to rotate within the bolster 20 and the roller bearings also provide lateral support for the spindle blade.

The bolster 20 of the textile spindle 10 is received in an opening 26 that is formed in the textile machinery rail 12. The diameter of the opening 26 is sufficiently larger than the outer diameter of the bolster 20 that an annular gap can exist between the outer circumferential surface of the bolster 20 and the inner circumferential surface of the opening 26 in the rail 12. The central lengthwise portion 28 of the outer surface of the bolster 20 is threaded and extends both above and below the machine rail 12. A nut or collar 30, which is fabricated of a substantially inextensible material, such as steel, and is relatively thick in cross section, is screwed onto the threaded outer surface 28 of the bolster 20 adjacent its upper end. The collar 30 is of larger diameter than the opening 26 in the machine rail 12 so that the collar is capable of supporting the textile spindle 10 on the machine rail. A locknut 32 is screwed onto the lower portion of the threaded outer surface 28 of the bolster 20. Like the collar 30, the locknut 32 is fabricated of a substantially inextensible material, is relatively thick in cross section, and is of a larger diameter than the opening 26 in the machinery rail 12. When properly positioned, the collar 30 and the locknut 32 can support the textile spindle 10 by clamping the machinery rail 12 between them.

Figure 2:
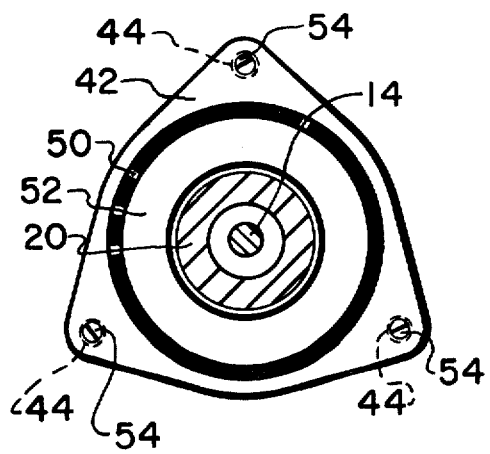
FIG. 2 is a view of the support system of FIG. 1 taken along line 2—2 of FIG. 1.

If the collar 30 and the locknut 32 directly engaged the machinery rail 12, there would be nothing to prevent vibrations caused by rotation of the spindle blade 14 and its associated sleeve 16 from being transmitted through the bolster 20 and the collar 30 and locknut 32 to the textile machinery rail. Accordingly, to isolate the textile spindle 10 from the machinery rail 12, a support system 36 is interposed between the rail and the collar 30 and locknut 32. The support system 36 includes two separate and spaced apart subassemblies 38 and 40. The upper subassembly 38 incorporates a relatively large, substantially rigid flange member or base plate 42 that is fabricated of a substantially inextensible material, such as steel. (The rigidity of the base plate 42 and the inextensibility of the material from which the base plate is fabricated are to be judged in comparison to the elastomer used in the support system 36.) As best shown in FIG. 2, the base plate 42 is generally triangular in shape and has a threaded bore 44 formed adjacent each of its apexes. The base plate 42 also has in it a central opening 46 that is of larger diameter than the spindle bolster 20.

On its upper surface, the base plate 42 of the upper subassembly 38 has a shallow annular recess 48 that encircles the central opening 46. The recess 48 receives an annular body of elastomer 50, which may be either natural rubber or a synthetic elastomer. The elastomer 50 is bonded to the horizontal and vertical surfaces of the recess 48 and is of sufficient thickness that it extends above the upper surface of the base plate 42. The inner circumference of the annular body of elastomer 50 is larger than the outer circumference of the bolster 20, but is somewhat smaller than the inner circumference of the opening 46 formed in the base plate 42. Bonded to the flat upper surface of the elastomeric annulus 50 is a relatively thin annular washer or contact member 52 that is fabricated of a relatively inextensible material, such as steel or a similar metal. The outer circumference of the contact member 52 is slightly smaller than the outer circumference of the elastomeric annulus 50. The inner circumference of the contact member 52 is roughly equal to the inner circumference of the opening 46 in the base plate 42. When the subassembly 38 is installed, the upper surface of the contact member 52 is juxtaposed with and contacts the bottom surface of the collar 30.

The lower surface of the base plate 42 is generally flat and could contact and lie flush against the upper surface of the rail 12. Normally, however, the lower surface of the base plate 42 will remain spaced a small distance from the rail 12. The separation between the base plate 42 and the rail 12 is provided by three short, metal set screws 54 that are received in the threaded bores 44 formed in the base plate. The screws 54 are screwed into the threaded bores 44 far enough so that the lower ends of the screws project below the bottom surface of the base plate and contact the machine rail 12. The set screws 54 thus support the base plate 42 in spaced relation relative to the rail 12.

The lower subassembly 40 of the support system 36 includes an annular body of elastomer 56 and two annular washers 58 and 60 disposed on opposite surfaces of the body of elastomer 56. The elastomeric annulus 56 may be fabricated of either natural rubber or a synthetic elastomer, while the washers 58 and 60 are fabricated of steel or another substantially inextensible material. The annular body of elastomer 56 has an inner circumference that is slightly larger than the outer circumference of the bolster 20. The outer circumference of the elastomeric body 56 is larger than the circumference of the opening 26 in the rail 12. Similarly, the inner circumferences of the washers 58 and 60 are larger than the outer circumference of the bolster 20, while the outer circumferences of the washers are larger than the circumference of the opening 26 formed in the machine rail 12. The inner circumferences of the washers 58 and 60 are also slightly larger than the inner circumference of the elastomeric annulus 56. When the subassembly 40 is installed, the upper surface of the washer 58 contacts the lower surface of the machine rail 12, while the lower surface of the washer 58 is bonded to the elastomeric annulus 56. Conversely, the upper surface of the washer 60 is bonded to the elastomeric annulus 56, while the lower surface of the washer 60 contacts a washer 62 interposed between the subassembly 40 and the locknut 32. The washer 62 distributes the pressure applied by the locknut 32 over a larger surface area of the subassembly 40 than would the locknut alone.

To mount the textile spindle 10 on the machine rail 12 using the support system 36, the collar 30 is screwed onto the upper end of the threaded portion 28 of the bolster 20. The bolster 20 is inserted into the central opening of the upper subassembly 38 of the support system 36 and the subassembly is moved up along the bolster until the contact member 52 contacts the collar 30. With the collar 30 and the subassembly 38 encircling it, the bolster 20 is inserted into the opening 26 in the machine rail 12 so that the subassembly 38 of the support system 36 is disposed between the collar 30 and the machine rail. The lower subassembly 40 of the support system 36 is positioned around the lower end of the bolster 20, as are the washer 62 and the locknut 32. The locknut 32 is then tightened until the machine rail 12, the two subassemblies 38 and 40, and the washer 62 are all securely clamped between the collar 30 and the locknut 32.

With the textile spindle 10 mounted on the machine rail 12 by the support system 36, as described above, every inextensible element that is either part of or is secured to the spindle 10 is separated from the machine rail 12 by a body of elastomer 50 or 56. Thus, the two bodies of elastomer 50 and 56 will act to isolate the machine rail from vibrations generated when the spindle blade 14 is rotated to wind yarn on a yarn package (not shown) carried by the spindle. As the spindle blade 14 rotates, the spindle 10 will tend to vibrate so as to translate axially and radially and also to tilt or cock about axes that are generally perpendicular to its longitudinal axis 64 (i.e., the axis of rotation of the spindle blade). Radial translational movements of the spindle 10 will be accommodated through shearing deflection of the bodies of elastomer 50 and 56. The shearing deflection is permitted because of the spacing between the outer circumference of the bolster 20 of the spindle 10, on the one hand, and the inner circumferences of the opening 26 in the rail 12 and the subassemblies 38 and 40 in which the bodies of elastomer 50 and 56 are incorporated, on the other hand. Axial and tilting movements of the spindle 10 relative to the machine rail 12 will be accommodated and resisted through compression loading of the bodies of elastomer 50 and 56.

After the spindle 10 is securely mounted on the machine rail 12 using the support system 36, but before the spindle is put into operation, the vertical alignment of the spindle must be checked. Assuming, as is highly likely, that the spindle 10 is not properly aligned, it may be brought into plumb by appropriate manipulation of the set screws 54. Clockwise rotation of any one of the screws 54 will cause the screw to move deeper into its threaded bore 44 and to project a greater distance from the lower surface of the base plate 42. As a result, the apex or corner of the base plate 42 at which the set screw 54 is located will be raised away from the machine rail 12. The opposite result can be achieved by turning the set screw 54 in a counter-clockwise direction so as to back the screw out of its threaded bore 44. Thus, by adjusting the set screws 54, the base plate 42 can be tilted or canted relative to the machine rail 12.

As the orientation of the base plate 42 relative to the machine rail 12 is changed due to adjustments of the set screws 54, the motion of the base plate 42 is transmitted through the body of elastomer 50, the contact member 52, and the collar 30 to the textile spindle 10. The spindle 10 will tend to retain its orientation relative to the base plate 42 and to tilt or cock with the base plate relative to the machine rail 12. The subassembly 40 of the support system 36 helps insure that adjustments in the orientation of the base plate 42 relative to the rail 12 will produce corresponding changes in the vertical orientation of the spindle 10, rather than mere localized compression of the body of elastomer 50 between the base plate and the collar 30. The elastomer 56 in the lower subassembly 40 will accommodate tilting of the spindle 10 by being compressed, along a portion of its circumference, between the machine rail 12 and the locknut 32. There may also be some compression deformation of the body of elastomer 50 in the upper subassembly 38. Nonetheless, adjustments in the positions of the set screws 54 can produce needed changes in the vertical alignment of the spindle 10 without the necessity of loosening the clamping action of the collar 30 and the locknut 32.

Figure 3:
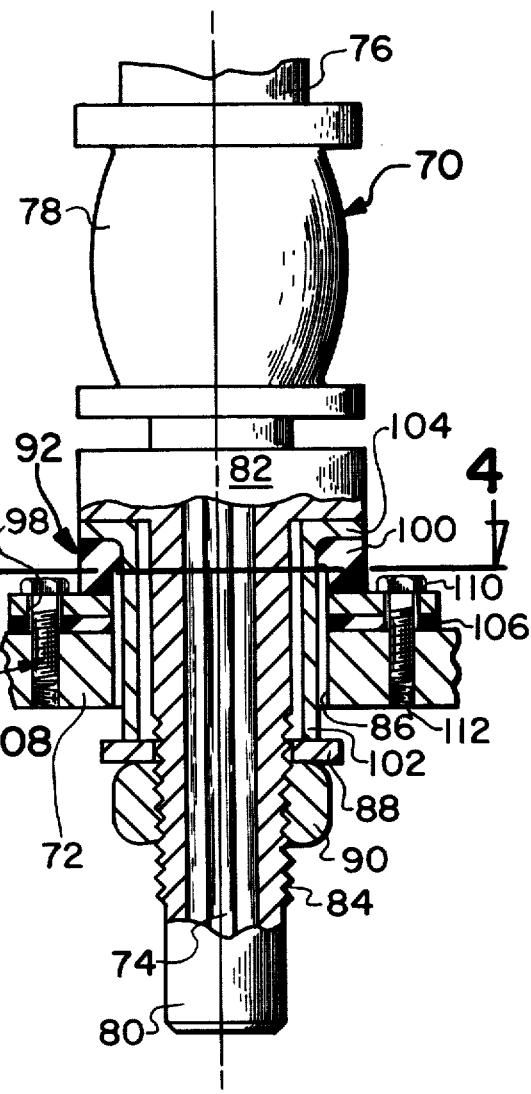
FIG. 3 is a view corresponding to FIG. 1 illustrating a second embodiment of the support system of the present invention.

FIG. 3 of the drawing illustrates a second embodiment of the invention which is used to mount a textile spindle 70 on a machine rail 72. Like the spindle 10, the spindle 70 includes a spindle blade 74 and a tubular sleeve 78 carried by the spindle blade and defining a whorl 78. The lower end of the spindle blade 74 is received in a tubular metal bolster 80 that is closed at its lower end. Adjacent the upper end of the bolster 80 is a radially extending steel collar or flange 82 that is formed in one piece with the bolster 80. A portion 84 of the outer circumference of the bolster 80 located approximately midway between its lower end and the flange 82 is threaded.

The bolster 80 is received in an opening 86 which is formed in the machine rail 72 and which has a larger diameter than the bolster. The opening 86 is of a smaller diameter, however, than the flange 82. The threaded portion 84 of the outer circumference of the bolster 80 projects below, but not above, the machine rail 72 when the bolster is received in the opening 86. A steel washer 88 encircles the threaded portion 84 of the surface of the bolster 20 and is supported by a steel locknut 90 screwed onto the threaded portion of the bolster. The outer diameter of the annular washer 88 is larger than the diameter of the opening 86 in the machine rail 72. As a result, the machine rail 72 could be clamped between the flange 82, on the one hand, and the washer 88 and the locknut 90, on the other hand, to mount the spindle 70 on the machine rail 72.

Figure 4:
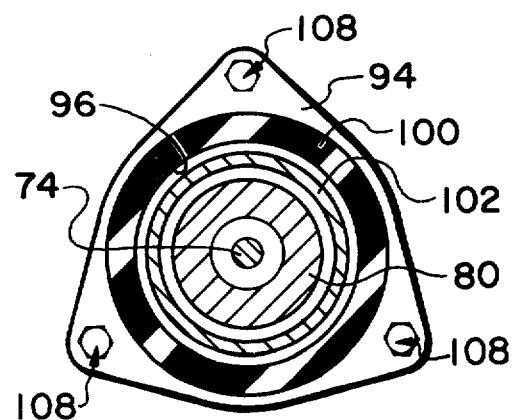
FIG. 4 is a view corresponding to FIG. 2 taken along line 4—4 of FIG. 3.

To isolate the machine rail 72 from vibrations generated by the spindle 70, a support system or mounting assembly 92 according to the present invention is interposed between the spindle and the machine rail. The mounting assembly 92 incorporates a substantially rigid base plate 94 that is fabricated of a substantially inextensible material, such as steel. As best shown in FIG. 4, the base plate 94 is generally triangular in shape and has a central opening 96, which is of significantly larger diameter than the main tubular portion of the bolster 80. Adjacent each of the three apexes of its triangular shape, the base plate 94 has formed in it a bore 98 that is not threaded. Bonded to the upper surface of the base plate 94 around the central opening 96 is an annular body of elastomer 100, which may be natural rubber or a synthetic elastomer. The inner diameter of the elastomeric annulus 100 is significantly larger than the outer diameter of the main tubular portion of the bolster 80. The outer diameter of the elastomeric annulus 100 is of a size such that the elastomer is spaced radially inwardly from the bores 98 formed in the base plate 94.

Received within the central opening 96 of the base plate 94 is a sleeve 102 that is long enough to project both above and below the machine rail 72. The sleeve 102 carries at its upper end a radially outwardly extending flange 104 that is formed in one piece with the sleeve of a substantially inextensible material, such as steel. The sleeve 102 is supported on the elastomeric annulus 100 by the flange 104, which is bonded to the upper surface of the annulus. The diameter of the inner circumferential surface of the sleeve 102 is larger than the outer diameter of the bolster 80 so that an annular gap exists between the bolster and the sleeve. Except for its integral flange 104, the sleeve 102 has an outer diameter that is smaller than both the diameter of the opening 86 formed in the machine rail 72 and the diameter of the central opening 96 formed in the base plate 94. The sleeve 102 is thus spaced radially from both the bolster 80 and the machine rail 72. It is also spaced radially about its circumference from the base plate 94 and from at least a portion of the interior circumferential surface of the elastomeric annulus 100. An annular portion of the outer circumference of the sleeve 102 located adjacent to the flange 104 is in contact with and bonded to a juxtaposed annular portion of the inner circumferential surface of the elastomeric annulus 100.

The lower end of the sleeve 102 contacts the upper surface of the washer 88.

Bonded to the underside of the base plate 94 is a body of elastomer 106 that is generally coextensive with the base plate. The body of elastomer 106 has a central opening in it that is of roughly the same diameter as the central opening 96 in the base plate 94. Likewise, the body of elastomer 106 has formed in it three bores that are aligned with the bores 98 formed in the base plate 94. While the upper surface of the body of elastomer 106 is bonded to the underside of the base plate 94, the lower surface of the body of elastomer 106 contacts the upper surface of the machine rail 72. Received in each of the bores 98 of the base plate 94 and in each of the aligned bores formed in the body of elastomer 106 is a lug bolt 108. The head 110 of each lug bolt 108 is wider than the diameter of the bore 98 in which the bolt is received. The threaded shank of each bolt, however, is noticeably smaller in diameter than the bores 98 and the aligned bores in the body of elastomer 106. Each bolt 108 is screwed into a threaded bore 112 which is formed in the upper surface of the machine rail 72 and which is in general alignment with a bore 98 formed in the base plate 94. The three bolts 108 thus secure the base plate 94 and the entire mounting assembly 92 to the machine rail 72.

To mount the textile spindle 70 on the machine rail 72 using the mounting assembly 92, the assembly is placed on the machine rail 72 with the sleeve 102 projecting through the opening 86 in the machine rail. The bores 98 in the base plate 94 are also aligned with the bores 112 in the machine rail. Each of the three bolts 108 is inserted into a smooth bore 98 and is screwed partway into a threaded bore 112. Before the bolts 108 are tightened, the sleeve 102 is centered within the opening 86 by sliding the mounting assembly 92 on the upper surface of the machine rail 72. The oversize bores 98 in the base plate 94 and the correspondingly oversize bores in the body of elastomer 106 permit the mounting assembly 92 to be moved about even though the bolts 108 are in place. When the sleeve 102 is centered in the opening 86, the bolts 108 are tightened to secure the assembly 92 in position. The bolster 80 of the spindle 70 is inserted into the sleeve 102 of the mounting assembly 92 until the lower surface of the flange 82 formed on the bolster contacts the upper surface of the flange 104 of the sleeve 102. The washer 88 is placed over the projecting lower end of the bolster 80 and the locknut 90 is screwed onto the threaded portion 84 of the outside surface of the bolster 80. The locknut 90 is tightened until the sleeve 102 of the mounting assembly 92 is firmly clamped between the flange 82 formed on the bolster 80 and the washer 88 and locknut 90. The spindle 70 is thus securely attached to the mounting assembly 92, which, in turn, is secured to the machine rail 72. The spindle 70 and any structure attached to it, such as the locknut 90, are also separated from the machine rail 72 by the annular body of elastomer 100. As a result, any vibrations generated by the spindle 70 must pass through and will be attenuated by the body of elastomer 100.

To plumb the textile spindle 70 relative to the machine rail 72 prior to placing the spindle in operation, the bolts 108 may be screwed into or out of the bores 112 formed in the machine rail. As a bolt 108 is screwed into its corresponding bore 112, the head 110 of the bolt 108 will apply pressure on the base plate 94 and will tend to force the corner of the base plate adjacent the bolt toward the upper surface of the machine rail 72. The body of elastomer 106, which normally maintains the base plate 94 in spaced relation relative to the upper surface of the machine rail 72, will tend to deflect or deform under the pressure exerted by the bolt 108 and the corner of the base plate 94. Deflection of the elastomer 106 will permit the corner of the base plate 94 to move toward the machine rail 72. Because the bores 98 and the aligned bores in the body of elastomer 106 are oversize with respect to the shank of each bolt 108, the base plate 94 will not bind against the bolts even when the base plate is tilted relative to the shanks of the bolts. As a bolt 108 is screwed out of a threaded bore 112, the adjacent portion or corner of the base plate 94 will be permitted to move away from the upper surface of the machine rail 72. To maintain resilient support for the base plate 94 in situations where a bolt 108 is being screwed out of a threaded bore 112, it will be desirable, and possibly necessary, to precompress the body of elastomer 106 to some degree prior to making any adjustments of the positions of the bolts. Thus, backing a bolt 108 out of a bore 112 will merely release some of the precompression load applied by the bolt at one corner of the base plate 94 and will still maintain the mounting assembly 92 in intimate contact with the upper surface of the machine rail 72. As the orientation of the base plate 94 with respect to the upper surface of the machine rail 72 is changed by manipulation of the bolts 108, the body of elastomer 100, the sleeve 102, and the spindle 70 will tend to follow the orientation of the base plate.

In both the support system 36 and the mounting assembly 92, three adjusting devices, such as screws or bolts, have been utilized. Nonetheless, the support system or mounting assembly of the invention may provide an acceptable degree of adjustability if only two adjusting devices are utilized. In such an arrangement, there would still be three points of rigid (as opposed to resilient) contact between the mounting assembly and the machine rail. One of the contact points, however, would merely be a dimple or projection formed to extend downwardly a fixed distance from the lower surface of the base plate of the support system. It would also be possible to utilize the support system 36 and the mounting assembly 92 in positions inverted from the positions shown in the drawing. The resulting tension loads on the elastomer 100 in the mounting assembly 92, however, probably would not be desirable.

It will be understood that the embodiments of the invention described above are merely exemplary and that persons skilled in the art may make many variations and modifications without departing from the spirit and scope of the invention. All such modifications and variations are intended to be within the scope of the invention as defined in the appended claims.

What is claimed is:

1. An adjustable support system for mounting a first member on a second member and for reducing the transmission of vibrations between the first and second members, said support system comprising:
   (a) means defining a substantially rigid flange member;
   (b) means secured to the flange member for mounting the first member resiliently relative to the flange member, the resilient mounting means including at least one body of elastomer;
   (c) means for spacing the flange member apart from the second member, the spacing means including a portion for at least contacting the flange member and a portion for at least contacting the second member;

(d) means for adjusting the spacing between at least a portion of the flange member and at least a portion of the second member so as to change the flange member's orientation relative to the second member, the adjusting means including a portion for at least contacting the flange member and a portion for at least contacting the second member, the adjusting means being disposed to contact the flange member in spaced relation relative to the resilient mounting means so as to avoid compressing the elastomer in the mounting means between the adjusting means and the flange member; and (e) means for resiliently permitting and accommodating adjustments in the spacing between the flange member and the second member, the adjustment accommodating means including at least one body of elastomer and having a portion for at least contacting the second member and a portion for at least contacting a member that moves in response to adjustments of the adjusting means.

2. An adjustable support system, according to claim 1, wherein the spacing means is carried by the flange member.

3. An adjustable support system, according to claim 2, wherein the spacing means includes at least one body of elastomer secured to the flange member.

4. An adjustable support system, according to claim 3, wherein the adjustment accommodating means includes the body of elastomer of the spacing means.

5. An adjustable support system, according to claim 2, wherein the flange member has formed in it at least two threaded bores, and wherein the spacing means includes at least two threaded members received in the threaded bores of the flange member.

6. An adjustable support system, according to claim 5, wherein the adjusting means includes said at least two threaded members of the spacing means.

7. An adjustable support system, according to claim 1, wherein the flange member has formed in it a central opening for receiving the first member.

8. An adjustable support system, according to claim 7, wherein the flange member also has formed in it at least two peripheral openings for receiving the adjusting means, the peripheral openings being spaced from the central opening in the flange member and from each other in a circumferential array about the central opening.

9. An adjustable, vibration isolating support system for mounting a textile spindle on a machine rail or the like comprising:

(a) means defining a substantially rigid flange member, the flange member having formed in it a central opening for receiving the textile spindle;

(b) means secured to the flange member about its central opening for mounting the textile spindle resiliently relative to the flange member, the resilient mounting means including at least one body of elastomer;

(c) means for spacing the flange member apart from the machine rail, the spacing means including a portion for at least contacting the flange member and a portion for at least contacting the machine rail;

(d) means for adjusting the spacing between at least a portion of the flange member and at least a portion of the machine rail so as to change the flange member's orientation relative to the machine rail and thereby to change the vertical orientation of the textile spindle relative to the machine rail when said spindle is mounted on the machine rail by the support system, the adjusting means including a portion for at least contacting the flange member and a portion for at least contacting the machine rail, the adjusting means being disposed to contact the flange member in spaced relation relative to the resilient mounting means so as to avoid compressing the elastomer in the mounting means between the adjusting means and the flange member; and (e) means for resiliently permitting and accommodating adjustments in the spacing between the flange member and the machine rail, the adjustment accommodating means including at least one body of elastomer and having a portion for at least contacting the machine rail and a portion for at least contacting a member that moves in response to adjustments of the adjusting means.

10. An adjustable support system, according to claim 9, wherein the spacing means is carried by the flange member.

11. An adjustable support system, according to claim 10, wherein the spacing means includes at least one body of elastomer secured to the flange member.

12. An adjustable support system, according to claim 11, wherein said at least one body of elastomer of the spacing means has formed in it a central opening that is aligned with the central opening in the flange member.

13. An adjustable support system, according to claim 12, wherein the adjustment accommodating means includes said at least one body of elastomer of the spacing means.

14. An adjustable support system, according to claim 10, wherein the flange member also has formed in it at least two threaded bores that are spaced from the central opening and from each other in a circumferential array about the central opening, and wherein the spacing means includes at least two threaded members received in the threaded bores of the flange member.

15. An adjustable support system, according to claim 14, wherein the adjusting means includes said at least two threaded members of the spacing means.

16. An adjustable support system, according to claim 9, wherein the flange member also has formed in it at least two peripheral openings for receiving the adjusting means, the peripheral openings being spaced from the central opening in the flange member and from each other in a circumferential array about the central opening.

17. An adjustable support system, according to claim 16, wherein the said at least one body of elastomer of the adjustment accommodating means is annular and is separate from the flange member.

18. An adjustable support system, according to claim 9, wherein said at least one body of elastomer of the resilient mounting means has formed in it a central opening that is aligned with the central opening in the flange member.

19. An adjustable support system, according to claim 18, wherein said at least one body of elastomer of the resilient mounting means is bonded to one side of the flange member, and wherein the portion of the adjusting means for contacting the machine rail is disposed on the other side of the flange member.

20. An adjustable, vibration isolating support system for mounting a textile spindle on a machine rail or the like, the machine rail having formed in it an opening to receive the textile spindle, the spindle carrying two annular flanges that extend radially from the spindle and are spaced apart along the length of the spindle, at least one of said two spindle flanges being movable along the length of the spindle to clamp the spindle to a supporting structure disposed between the spindle flanges, the support system comprising:

(a) means defining a flange member fabricated of substantially inextensible material, the flange member having formed in it a central opening for receiving the textile spindle and at least two peripheral openings that are spaced from the central opening and from each other in a circumferential array about the central opening;

(b) means secured to the flange member about the central opening for mounting the textile spindle resiliently relative to the flange member, the resilient mounting means including at least one body of elastomer that has formed in it a central opening aligned with the central opening in the flange member;

(c) means for spacing the flange member apart from the machine rail, the spacing means including a portion for at least contacting the flange member and a portion for at least contacting the machine rail;

(d) means for adjusting the spacing between at least a portion of the flange member and at least a portion of the machine rail so as to change the flange member's orientation relative to the machine rail and thereby to change the vertical orientation of the textile spindle relative to the machine rail when said spindle is mounted on the machine rail by the support system, the adjusting means including at least two threaded members that are received in the peripheral openings of the flange member, each threaded member having a surface for at least contacting the flange member and a surface for at least contacting the machine rail, the threaded members also being spaced from said at least one body of elastomer of the resilient mounting means so as to avoid compressing said at least one body of elastomer between the threaded members and the flange member; and (e) means for resiliently permitting and accommodating adjustments in the spacing between the flange member and the machine rail, the adjustment accommodating means including at least one body of elastomer that has formed in it a central opening, the adjustment accommodating means having one surface for contacting the machine rail and a second surface opposite the first surface for contacting a member that moves in response to adjustments of the adjusting means.

* * * * *